United States Patent [19]
König

[11] Patent Number: 5,227,174
[45] Date of Patent: Jul. 13, 1993

[54] APPARATUS FOR PORTIONING DOUGH

[76] Inventor: Helmut König, Statteggerstrasse 80, A-8045 Graz, Austria

[21] Appl. No.: 768,780

[22] PCT Filed: Feb. 1, 1990

[86] PCT No.: PCT/AT90/00015
§ 371 Date: Oct. 9, 1991
§ 102(e) Date: Oct. 9, 1991

[87] PCT Pub. No.: WO90/11689
PCT Pub. Date: Oct. 18, 1990

[30] Foreign Application Priority Data

Apr. 12, 1989 [AT] Austria .................. A 859/89

[51] Int. Cl.⁵ .............................. A21C 11/00
[52] U.S. Cl. .................. 425/147; 425/169; 425/220; 425/239; 425/240
[58] Field of Search .......... 425/145, 147, 169, 219, 425/220, 238, 239, 240, 241, 256, 261, 448, 449

[56] References Cited

U.S. PATENT DOCUMENTS

| | | | |
|---|---|---|---|
| 1,057,231 | 3/1913 | Frischmann | 425/239 |
| 2,539,319 | 1/1951 | Oyer | 425/240 |
| 2,666,229 | 1/1954 | Vogt | 425/239 |
| 4,771,915 | 9/1968 | Cand et al. | 425/238 |
| 4,828,863 | 5/1989 | Aoki | 425/240 |

Primary Examiner—Jay H. Woo
Assistant Examiner—James P. Mackey
Attorney, Agent, or Firm—Salter, Michaelson & Benson

[57] ABSTRACT

An apparatus for portioning dough has a filler hopper (31) for the dough in which hopper a pre-portioning tool (51) in form of two star rollers (32) is disposed which rotate in inverse direction and are driven by a drive device if the amount of dough in a chamber (30) below decreases a predetermined value. From this chamber the dough (30) is pressed by a pusher device (25) in receiving openings (4) on the periphery of a step-wisely rotated drum (2). The volume of dough in the chamber (30) is controlled by a capacitive sensor (35) embedded into the wall (36) of the filler hopper (31) so that this sensor (35) does not interfere with the stream of the dough.

8 Claims, 2 Drawing Sheets

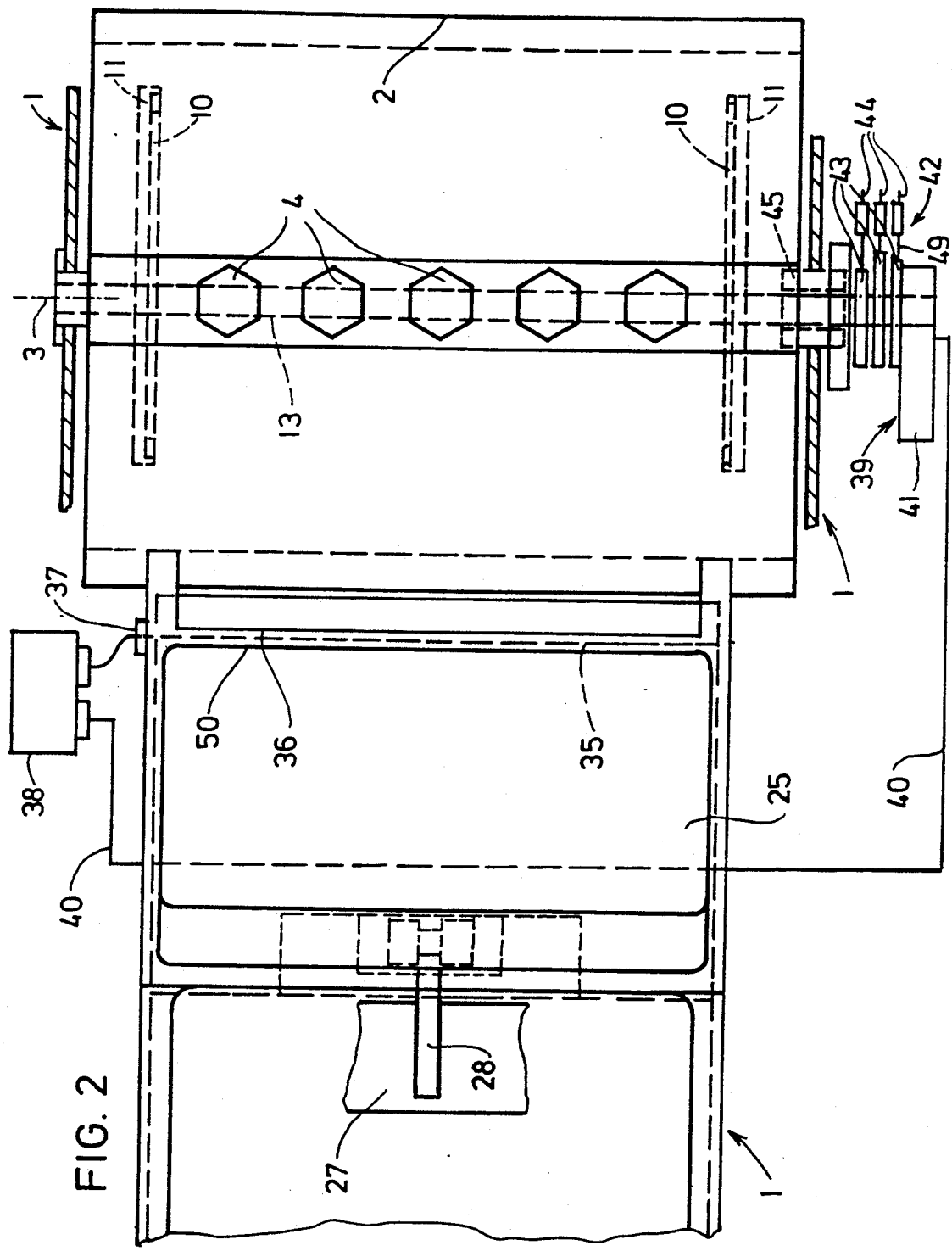

APPARATUS FOR PORTIONING DOUGH

The invention relates to an apparatus for portioning dough, comprising a filler hopper for the dough leading into a chamber from which the dough is moved by a pusher member to at least one receiving opening on the circumference of a drum bearingly supported for rotation around a horizontal axis, which receiving opening passes the chamber and, in cooperation with a stripper edge makes the proper portioning, a pre-portioning tool being provided in the filler hopper separate from the pusher member, preferably in form of two star rollers moved synchronously with opposite direction of rotation, and wherein a sensor means for the filling amount of dough in the chamber or, respectively, in the filler hopper is provided below the pre-portioning tool for controlling the drive means of the pre-portioning tool, and wherein an adjustment member for the volume of dough received by the respective receiving opening is provided.

An apparatus of this kind is known (for example German Offenlegungsschrift 2,244,469 and 2,853,270). Within the known construction the sensor means is formed by a rod adjustably supported with respect to its height position within the filler hopper above the path of the pusher member, which rod switches on the drive means of the star rollers when the amount of dough in the chamber decreases a predetermined value, so that dough is fed to this chamber. The dough pushed away by the pusher member lifts the rod whereby the drive means of the star rollers is switched off again and the stillstanding star rollers with their arms facing each other shut off the travel of dough to the chamber. Within this known embodiment it may happen that a greater amount of dough jams the rod so that it cannot more swivel to above, particularly if dough is jammed between the wall of the filler hopper and the rod.

Further it has been shown that difficulties arise if by means of the same apparatus alternatively dough portions having a low weight are produced with portions having a greater weight. It is known to provide the apparatus with an adjustment device by means of which the volume of the receiving opening at the proper portioning position can be adjusted to the desired volume of the dough portion. Since it has been shown that a smaller volume of dough shall be present in the chamber guiding the pusher means when producing dough portions of low weight, it is known within apparatus of the initially described kind to consider this circumstance by corresponding adjustment of the switch actuated by the sensor means. However, the greater volume of dough in the chamber or, respectively, within the section of the filler hopper below the star rollers is, the greater is the danger that the sensor rod is jammed by the dough. In dependence from the jammed position of the sensor means this may have as a consequence that either too less dough is conveyed in the chamber by the star rollers, what means the danger of idle portions, or that too much dough is conveyed into the chamber so that there the dough is excessively squeezed during movement of the pusher member.

The invention has at its object to avoid these disadvantages and to improve an apparatus of the initially described kind so that jamming of the sensor means by the dough is reliably avoided even if great amounts of dough are do be controlled in the chamber, or if the volume of the dough portions to be produced must be changed. The invention solves this task by the fact that as the sensor means at least two stationary capacitive sensors responsive to the approach of wet mass are provided, which sensors are inserted one above the other into the inner surface of the wall of the hopper member or, respectively, of the chamber and are related to different volumes of the dough portion to be produced, and that for adaptation to different volumes of the dough portions to be produced the respective active sensor ist selectable by means of a change-over switch which is coupled to the adjustment member for the desired volume of dough. Such sensors are known in other technical fields as capacitive approach indicators or, respectively, capacitive approach switches. They are based on a change of the capacitive proportions when the mass to be controlled approaches, sensors working along the capacitive principle being suitable for non-ferromagnetic masses. Whereas within the initially mentioned known apparatus the movement of the sensor relative to the walls of the chamber is used for the detection how much dough is present within the chamber, such a relative movement is totally avoided at the inventive sensor. Therefore, the movement of the sensor cannot more be jammed and any wrong indication caused by such a jamming is avoided. A further advantage of the use of an electric-capacitive sensor is that such a sensor responds only then if a substantial mass of dough approaches close by, but does not already respond to small amounts of dough. Thereby, false indications caused by small amounts of dough are avoided, for example by dough rests that adhere to the star rollers or to the walls of the filler hopper and then fall down. Whereas within the initially described known embodiment the sensor must be disposed in the free cross section of the filler hopper if the sensor should be efficient, within the inventive embodiment the sensor is in no way an obstacle to the path of dough.

Further, the invention solves the problem of changing the apparatus to different volumes of the dough portions or dough weights, respectively, so that detrimental influences upon the sensor activity are avoided. When changing from one volume of the dough portion to another, only the sensor related to the new volume must be switched on and the sensor related to the prior volume must be switched off in order to adjust to the new circumstances. Coupling the change-over switch for the capacitive sensors to the adjustment member facilitates this change and avoids erroneous handling. There are no difficulties to dispose a plurality of sensors within the filler hopper due to the fact that these sensors are installed in the wall of the filler hopper or of the chamber, respectively.

According to a preferred embodiment of the invention each sensor is disposed flush with the inner surface of the wall of the filler hopper or of the chamber, respectively. This results in the lowest possible friction resistances for the dough sliding in the filler hopper or, respectively, in the chamber.

From the U.S. Pat. specification No. 3,939,360 it is known to apply capacitive approach sensors in form of strips to the outer wall of an infusion bottle in order to control the filling level of the infusion solution within the bottle. Such an arrangement would not be suitable within an inventive dough portioning apparatus.

It is of particular advantage to couple the change-over switch and the adjustment member also to an adjustment member for varying the kneading space of a kneading device disposed in the region of the upper summit of the drum. In this manner one adjusts automatically to the fact that a bigger dough portion needs more room for the kneading operation.

In most cases apparatus of the initially described kind are so constructed that the receiving openings are disposed in a plurality of rows on the circumference of the drum, each row containing a plurality of receiving openings. Within such an embodiment it is suitable within the spirit of the invention if each sensor extends in form of a ledge over substantially the entire length of that wall of the chamber which extends parallel to the axis of the drum and adjacent thereto. The sensor, therefore, is common for all receiving openings of the row and is disposed at that wall at which the dough is mainly pressed to above by the pusher member at its forward movement.

BRIEF DESCRIPTION OF THE DRAWINGS

In the drawings an exemplative embodiment of the invention is schematically shown. FIG. 2 is a view from above to the apparatus, partially in section.

Figure 1:
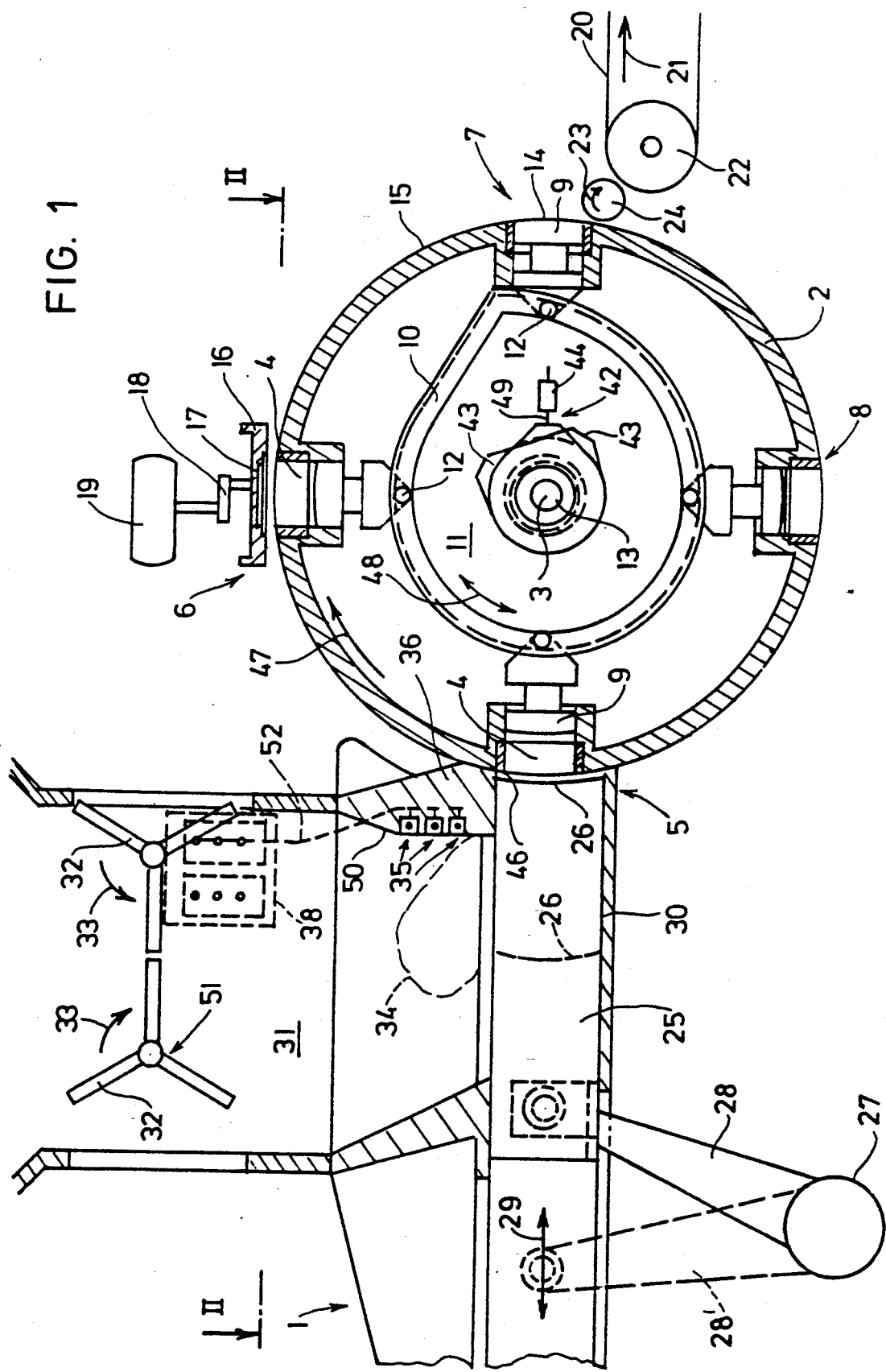
FIG. 1 shows a vertical section through the apparatus.

In a frame 1 a drum 2 is supported for rotation around a horizontal axis 3. A plurality of receiving openings 4 for the dough to be portioned is disposed on the circumference of the drum 2 in four rows running parallel to the axis and distributed in equal distances over the circumference of the drum 2. A portioning station 5, a kneading station 6, an ejecting station 7 an a further station 8 are distributed over the circumference of the drum 2, the later station may constitute an unoccupied station, which, however, may also be used for special purposes, for example for flowering or oiling of the receiving openings 4. The drum 2 is stepwisely driven such that the receiving openings 4 advance for one station at each step. In each receiving opening 4 a piston 9 is shiftably guided in radial direction, which piston is guided along curved path 10 of a cam disc 11 in the interior of the drum 2. Suitably two such cam discs 11 are provided (FIG. 2) which are keyed to a central shaft 13 of the drum 2 at the two front ends of the drum 2. The pistons 9 are guided by means of rods 12 (FIG. 1) in the related curved paths 10 of the two cam discs 11. By a not shown drive means the shaft 13 is so oscillatingly driven in direction of the double arrow 48 that the curved discs 11 are also rotated together with the drum during the forward movement of the drum 2 for one step, no relative movement of the cam discs 11 relative to the drum 2 occuring during this forward movement of the drum 2 and therefore also no shift of the pistons 9 in the receiving openings 4. During the stillstand of the drum 2 between two subsequent steps of feed, however, the cam discs 11 are fed back into the starting position, whereby the pistons 9 are advanced or retracted in correspondence to the shape of the curved paths 10. The shape of the curved paths 10 is such that at the portioning location 5 the piston 9 is retracted in the receiving opening during the stillstand of the drum, what causes a suction effect on the dough to be brought into the receiving opening 4. At the kneading station 6 the pistons, starting from the end position reached in the portioning station 5, are gradually further retracted in the receiving openings 4, so that during the kneading process room is made for the transition of the dough piece in a substantially spherical shape. To the contrary, at the ejecting station 7 each piston 9 is advanced during the stillstand of the drum 2 until the front surface 14 of the piston 9 is flush with the outer circumference surface 15 of the drum 2. In the unoccupied station 8 the pistons 9 may remain in this position, however, they may also already be retracted before they reach this station, as this is shown in FIG. 1.

However, it is also possible to obtain the same movements of the pistons 9 in the receiving openings 4 by cam discs 11 disposed outside the drum, and also a plurality of cam discs or curved paths disposed on pivotable levers or the like, respectively, may be disposed, always one of them being related to one of the stations.

At the kneading station 6 disposed in the region of the upper summit of the drum 2 a kneading tool 16 is disposed which is formed in a known manner as a plate provided with stepped recesses 17. Always one of these recesses 17 is disposed over a receiving opening 4 during the kneading process of the dough piece disposed within the receiving opening 4. The kneading tool 16 is driven to a circular movement by a motor 19 via an excenter drive 18, whereby the surface of the dough piece disposed within the receiving opening 4 is taken along by the edge of the recess 17 and by and by is changed into a spherical shape due to the circular movement.

At the ejecting station 7 a conveyor belt 20 is disposed which is driven in direction of the arrow 21 and is guided over a guide roller 22 disposed adjacent the drum 2, however spaced a short distance from the periphery thereof. The gap between this guide roller 22 and the outer surface 15 of the drum 2 is bridged by a transition roller 24 driven for rotation in direction of the arrow 23, which transition roller guides the dough pieces ejected from the pistons 9 smoothly onto the conveyor belt 20.

At the portioning station 5 the dough is pressed into the receiving openings 4 by a pusher member 25, the front surface 26 thereof is curved corresponding to the peripheral surface 15 of the drum. The pusher member 25 is driven in direction of the double arrow 29 by a swivellable lever 28 swivelled by a shaft 27. Its outermost front position is shown by full lines, its rear dead position by dotted lines. The pusher member 25 is guided within a chamber 30 into which the dough to be portioned is fed in pre-portioned manner from a filler hopper 31 in which a pre-portioning tool 51 is disposed which is constituted by two star rollers 32 having three arms, which rollers are supported for rotation around horizontal axes disposed parallel to each other. Each one of the two star rollers for itself can be driven in one direction (arrows 33) only, so that the two star rollers 32 rotate in inverse sense, however, synchronously and intermittently. In the stillstand phase of the intermittent rotational movement shown in FIG. 1 the two star rollers 32 shut off the path of dough through the filler hopper 31 by means of their arms facing each other. However, if the star rollers 32 are driven for rotation, they convey a piece of dough into the section of the filler hopper 31 disposed below the star rollers 32 and therefore into the chamber 30. In order to avoid that there is too much dough 34 in the chamber 30 so that the dough could be squeezed in an undiserable manner when moving the pusher member 25, three capacitive sensors 35 responsive to the approach of wet mass are embedded in that wall 36 of the chamber 30 or the lower section of the filler hopper 31, respectively, which is disposed parallel to the axis 3 of the drum 2 and neighbouring the drum 2. Each one of these sensor 35 has the shape of a ledge extending over substantially the entire length of that wall 36 and being flush with the inner surface 50 of the wall 36. From these sensor 35 always only one is effective. Each sensor 35 is so put into the drive of the star rollers 32 that the sensor 35 allows this drive only then to move if the volume of the dough 34 in the chamber 30 decreases a predetermined value. As soon as this is the case, the star rollers 32 convey dough into the chamber 30. This conveyed amount of dough may be a predetermined amount of dough corresponding to a certain angle of rotation of the star rollers 32, or the arrangement may be such that the sensor 35 shuts off the drive means of the star rollers 32 when the volume of dough in the chamber 30 has again reached a certain value.

The disposal of three sensors 35 one above the other enables one to adjust the dough volume in the chamber 30 to the volume of the dough portions to be produced. If smaller dough portions are to be produced, the lowermost of the sensors 35 is switched in and for bigger dough portions to be produced the middle one of the sensors and for big dough portions the uppermost sensor 35 corresponding to the greatest volume of dough in the chamber 30. For this, the sensors can be at choice switched in by means of a change-over switch 37 (FIG. 2), so that always one of the sensors 35 is connected via a line 52 to a control circuit 38 for the drive means of the star rollers 32. The change-over switch 37 may be mechanically or electrically coupled to an adjustment member 39, for example via a line 40, by which member the volume of dough of the dough portion to be produced can be adjusted. This adjustment member 39 may comprise for example a gear means, in particular a worm gear, by means of which the relative position of a swivellable arm 41 can be varied relative to the shaft 13 carrying the cam discs 11. To the swivellable arm 41 a crank means is connected by means of which the oscillating movement of the shaft 13 or the cam discs 11 keyed to it is obtained. By means of this adjustment member 39, therefore, also the relative position of the cam discs 11 relative to the drum 12 can be varied which means an advancement or, respectively, retractment of the pistons 9 in the receiving openings 4. Thereby, suitable shape of the curved paths 10 provided, a bigger or smaller volume received by the receiving opening 4 at the portioning station 5 can be adjusted and thereby the volume of the portioned dough pieces can be varied.

Further, it is suitable if also an adjustment member 42 for varying the kneading circumstances for the kneading tool 16 at the kneading station 6 is coupled to the change-over switch 37 for switching the sensors and the adjustment member 39 for the volume of the dough portions to be produced. For example, the kneading space (volume of the receiving opening 4 at the kneading station 6) can be varied. For this, the pistons 9 at the kneading station 6 can be adjusted by means of the adjustment member 39 in an analogous manner to that which has been described for the portioning station 5. Thereby it can be considered that a bigger dough portion requires a bigger end volume of the receiving opening 4 in which this portion is disposed during the kneading process. As it has been described in connection with the variation of the volume of the receiving opening 4 at the portioning station 5, an automatic change-over to that sensor 35 can be obtained by a suitable electronic means at this change, which sensor corresponds to the dough volume present.

In addition thereto, for each sensor 35 a separate means may be provided for interrupting the backward movement of the pistons 9 during the kneading process for a certain time, what also corresponds to a variation of the kneading space of the kneading device in order to adapt one to the dough volume given by the selection of the sensor. For this, for each sensor 35 a cam disc 43 is keyed to the shaft 13 at the one front side of the drum 2, therefore in total three cam discs, each of which cooperates with an switch off-means 44 put into the power circuit of a magnetic coupling which couples the swivellable arm 41 or the cam discs 49, respectively, to the shaft 13 carrying the cam discs 11. As soon as the cam of the corresponding cam disc 43 hits a contact arm 49 of the related switch off-means 44, the shaft 13 and together with it the cam discs 11 remain at stillstand for a certain time, as long as the cam of the cam disc 43 leaves the contact arm of the switch off-means 44. Thereby it is achieved that during the kneading process not only the drum 2 stands still but for the same time interval also the cam discs 11 so that during this time interval the pistons 9 stand still in the receiving openings 4. Thereby it is ensured that at the beginning of the kneading process the piston 9 is retracted in the receiving opening 4 (as long as there is a relative movement between drum 2 and cam disc 11), and then remains in this partially retracted position for the same time interval and is moved back for the remaining portion of the retracting distance after the drive means of the shaft 13 have been switched in again. Thereby, an optimal tension is given to the dough piece during the kneading process and finally, after the dough piece has been shaped to a ball-like or, respectively, spherical shape, the volume of the receiving opening 4 is still somewhat increased so that the dough piece already being closed loosens well from the kneading tool 16 or its recesses, respectively. By varying the time interval during which the rotation drive of the shaft 13 is interrupted, this stillstand phase can be easily adapted to the given king of dough piece, in particular to the volume of the dough portion, For this, the cams of the cam discs 43 can not only be directed to different directions (as this is excessively shown in FIG. 1), but they can be also shaped to different profiles. If desired, also further cam discs can be provided for replacement for adaption to special circumstances.

The said interruption of the retracting movement of the cam discs 11 and thereby of the pistons 9 in the receiving openings 4 can also be obtained by switching off the main drive for the drum shaft 13 or, respectively, for the cam discs 11 for a predetermined time interval which suitably is adjustable and selectable, however, the drive means for the kneading tool 16 being still in motion. For this, an arrangement can be choosen as it is described for example in the Austrian patent specification no. 352,653, for example a shaft driven from the main motor, a cam disc being fixed to this shaft and being provided with a cam cooperating with a switch for switching off or, respectively, in the drive means of the drum shaft 13, suitably via a magnetic coupling. It is also possible that the switch operates a time switch which keeps the drive means for the drum shaft switched off for a predetermined time interval which suitably is adjustable. This switch and, respectively, or the switching cam can be adjustably disposed in order to provide for further adjustment possibilities.

I claim:

1. Apparatus for portioning dough comprising:

frame means;

a filler hopper on said frame means for holding dough therein, said filler hopper including an open bottom and a side wall having an interior surface and an exterior surface;

pre-portioning means in said filler hopper for preportioning said dough;

a dough chamber on said frame means, said dough chamber having an open top for receiving dough from the open bottom of said filler hopper, and an open front end;

a cylindrical drum having an outer surface and at least one cavity therein, said cavity opening outwardly through an aperture in said outer surface, said drum being rotatably mounted on said frame mans for rotation about a horizontal axis wherein the outer surface thereof rotates in closely spaced, adjacent relation to said front end of said dough chamber, a pusher member in said dough chamber for pushing said dough outwardly of said dough chamber into said cavity in said drum when said cavity is positioned at the front end of said dough chamber;

stripper means on the exterior surface of said side wall adjacent the front end of said dough chamber, said stripper means cooperating with the outer surface of said drum to strip away excess dough from the aperture of said cavity when said cavity is rotated away from the front end of said dough chamber;

means for adjusting the volume of said cavity;

at least two capacitive sensors mounted in vertically spaced relation on the interior surface of said side wall, said sensors being responsive to the approach of a moist mass of dough;

switch means associated with said capacitive sensors and said adjusting means for selective operation of one of said sensors in dependence on the volume selected for the cavity; and drive means for intermittently driving said preportioning means in dependence upon the amount of dough sensed by the operative capacitive sensor.

2. In the apparatus of claim 1, said capacitive sensors being imbedded within said side wall.

3. In the apparatus of claim 1, said capacitive sensors having a generally flat sensing surface, said sensors being mounted in said side wall so that said sensing surface is flush with said interior surface of said side wall.

4. In the apparatus of claim 1, said side wall having a front wall portion adjacent the front end of said dough chamber, said capacitive sensors comprising elongated sensors which are mounted in said front wall portion, said elongated sensors extending horizontally along substantially the entire length of said front wall portion parallel to the axis of the drum.

5. In the apparatus of claim 1, said drum having an upper summit region, said apparatus further comprising kneading means disposed at said upper summit region.

6. In the apparatus of claim 5, said cavity defining a kneading space, said apparatus further comprising means for increasing the volume of said kneading space as said cavity is rotated to a position adjacent said kneading means, said means for increasing said volume being associated with said switch means and said adjustment means for automatically selecting an increased volume of said kneading space in dependence on the volume selected for said cavity.

7. In the apparatus of claim 1, said pre-portioning means comprising a pair of star rollers rotatably mounted in said filler hopper for synchronous rotation in opposite directions.

8. In the apparatus of claim 1, said capacitive sensors being mounted in said side wall adjacent to the front end of said dough chamber.

* * * * *